US010239177B2

(12) United States Patent
Wiegmann et al.

(10) Patent No.: US 10,239,177 B2
(45) Date of Patent: Mar. 26, 2019

(54) METROLOGICAL APPARATUS AND METHOD FOR ADJUSTING THE ATTITUDE OF A ROTATION-SYMMETRICAL WORKPIECE

(71) Applicant: Carl Mahr Holding GmbH, Göttingen (DE)

(72) Inventors: Axel Wiegmann, Eisenberg (DE); Stefan Mika, Jena (DE); Ralf Kurch, Erfurt (DE)

(73) Assignee: Carl Mahr Holding GmbH, Goettingen (DE)

( * ) Notice: Subject to any disclaimer, the term of this patent is extended or adjusted under 35 U.S.C. 154(b) by 98 days.

(21) Appl. No.: 15/616,523

(22) Filed: Jun. 7, 2017

(65) Prior Publication Data

US 2017/0348814 A1    Dec. 7, 2017

(30) Foreign Application Priority Data

Jun. 7, 2016    (DE) .................. 10 2016 110 453

(51) Int. Cl.
  *B23Q 17/22*    (2006.01)
  *G01B 5/004*    (2006.01)
  (Continued)

(52) U.S. Cl.
  CPC ............. *B23Q 17/22* (2013.01); *B23Q 1/44* (2013.01); *B23Q 17/20* (2013.01); *G01B 5/0002* (2013.01);
  (Continued)

(58) Field of Classification Search
  CPC ...................................... B23Q 17/22
  (Continued)

(56) References Cited

U.S. PATENT DOCUMENTS 4,731,934 A    3/1988    Barnaby et al.
5,222,034 A *  6/1993    Shelton .................. G01B 5/008
                                                             33/503
(Continued)

FOREIGN PATENT DOCUMENTS

DE    19651232 C1    5/1998
DE    10102383 A1    7/2001
(Continued)

OTHER PUBLICATIONS

European Search Report in corresponding European Application No. 17155449.6, dated Jul. 24, 2017, 17 pages.

*Primary Examiner* — G. Bradley Bennett
(74) *Attorney, Agent, or Firm* — Fitch, Even, Tabin & Flannery LLP

(57) ABSTRACT

A metrological apparatus (15) is disposed for adjustment of an attitude of a workpiece (16) having an arcuate upper surface (17) relative to a rotary axis (C) of the metrological apparatus (15). The workpiece (16) is brought into a first rotary position ($c_1$). A plurality of measured points within a measuring plane on the upper surface (17) is recorded. The workpiece (16) is moved into a further rotary position ($c_2$) about the rotary axis (C), and again measured points in the measuring plane (E) on the upper surface (17) of the workpiece (16) are recorded. Based on these recorded measured points, the actual attitude (Li) of the workpiece (16) deviation from a specified target attitude (Ls) are determined. Adjustment parameters are determined, and an adjustment assembly (24) of the metrological apparatus (15) is activated as a function of the calculated adjustment parameters to adjust the workpiece (16).

18 Claims, 5 Drawing Sheets

(51) Int. Cl.
  *G01B 11/00*   (2006.01)
  *B23Q 1/44*    (2006.01)
  *B23Q 17/20*   (2006.01)
  *G01B 21/04*   (2006.01)
  *G01M 11/02*   (2006.01)
  *G01B 5/00*    (2006.01)
  *G01B 5/20*    (2006.01)
  *G01B 5/25*    (2006.01)
  *G02B 27/62*   (2006.01)

(52) U.S. Cl.
  CPC ............. *G01B 5/004* (2013.01); *G01B 5/20* (2013.01); *G01B 5/25* (2013.01); *G01B 11/002* (2013.01); *G01B 21/045* (2013.01); *G01B 21/047* (2013.01); *G01M 11/025* (2013.01); *G02B 27/62* (2013.01)

(58) Field of Classification Search
  USPC .......................................... 33/502, 503, 569
  See application file for complete search history.

(56) References Cited

U.S. PATENT DOCUMENTS

| | | | |
|---|---|---|---|
| 6,401,349 B1* | 6/2002 | Onyon | G01B 21/20 33/549 |
| 2001/0008994 A1 | 7/2001 | Omori et al. | |
| 2011/0258867 A1* | 10/2011 | McDonnell | G01B 5/008 33/502 |
| 2012/0246953 A1* | 10/2012 | Engel | G01B 21/045 33/502 |
| 2013/0111774 A1* | 5/2013 | McMurtry | G01B 5/0016 33/503 |
| 2015/0052767 A1* | 2/2015 | Sagemueller | G01B 21/045 33/503 |
| 2015/0107125 A1* | 4/2015 | Desforges | G01B 21/047 33/503 |
| 2016/0131470 A1* | 5/2016 | Ishikawa | G01B 21/045 33/503 |
| 2016/0178362 A1* | 6/2016 | Iseli | G01B 5/008 33/503 |
| 2016/0195382 A1* | 7/2016 | McMurtry | G01B 21/045 33/503 |
| 2016/0195389 A1* | 7/2016 | Sagemueller | G01B 21/045 33/503 |

FOREIGN PATENT DOCUMENTS

| | | |
|---|---|---|
| DE | 10340851 A1 | 3/2004 |
| DE | 102007015947 A1 | 10/2008 |
| DE | 102012023377 B3 | 5/2014 |
| GB | 2393790 A | 4/2004 |
| JP | 4699714 B2 | 6/2011 |
| WO | 2009124767 A1 | 10/2009 |

* cited by examiner

METROLOGICAL APPARATUS AND METHOD FOR ADJUSTING THE ATTITUDE OF A ROTATION-SYMMETRICAL WORKPIECE

RELATED APPLICATION

This application claims the benefit of German Patent Application No. DE 10 2016 110 453.1 filed Jun. 7, 2016, the content of which are incorporated herein by reference as if fully rewritten herein.

BACKGROUND

The invention relates to a method for adjusting the attitude (e.g. tilt and shift) of a rotation-symmetrical workpiece having an arcuate upper surface in a metrological apparatus, as well as a metrological apparatus for performing said method.

U.S. Pat. No. 4,731,934 A describes a metrological apparatus with a workpiece support that can be rotated about an rotary axis. For performing a measurement, the workpiece support is rotated with the workpiece arranged thereon. In conjunction with this, it is important for an accurate measurement that the axis of the workpiece be brought to coincide with the rotary axis. The metrological apparatus is disposed for measuring the dimensions of elongated workpieces having a cylindrical generated surface. A measurement is performed in circumferential direction of the workpiece in the direction of the rotary axis at a distance of the workpiece from the top and a distance of the workpiece from the bottom This allows the determination of the deviation of the axis of the workpiece relative to the rotary axis, and an appropriate positioning of the workpiece support can take place. This method is suitable only for workpieces displaying an adequately high generated surfaces in the direction of the rotary axis. Rotation-symmetrical bodies such as lenses, aspheres or the like cannot be adjusted in this manner.

A similar method has also been known, for example, from DE 101 02 383 A1 or DE 103 40 851 A1.

According to a method described in DE 10 2007 015 947 B4, a test measurement is performed prior to the actual measurement of a workpiece. In so doing, the zenith of the workpiece is determined, for example, based on several parallel profile measurements. The workpiece support is subsequently adjusted in such a manner that the zenith of the workpiece is located in the plane, in which the profile measurement is performed by means of the dial gauge of the metrological apparatus.

From WO 2009/124767 A1 a metrological apparatus is known, said apparatus comprising, for the determination of the axis of symmetry of a rotation-symmetrical workpiece, a special centering sensor that may be configured as an autocollimator. With the use of such an autocollimator, it is possible to determine the axis of symmetry of the spherical portion of the surface of the workpiece. The autocollimator detects the wobbling motion if the axis of symmetry of the workpiece does not coincide with a rotary axis of a rotationally driven workpiece support. This metrological apparatus thus requires a special, additional sensor that is not available in many universal metrological apparatus (shape measuring device and/or coordinate measuring devices).

DE 10 2012 023 377 B3 describes a method and an apparatus for measuring the position and adjustment of an asphere. With this method, a position value on the upper surface of the rotation-symmetrical workpiece is measured in several rotary positions at at least two different radial distances from the rotary axis, about which a workpiece is rotated. In other words, for each performed measurement, the measuring points are located on a circle around the rotary axis. If the axis of symmetry of the workpiece is not oriented exactly along the rotary axis, the measuring points describe a sine curve. It is possible, based on two or more such sine curves, to calculate the inclination of the axis of symmetry of the workpiece relative to the rotary axis, as well as the shift of the axis of symmetry relative to the rotary axis. This takes place, in particular, in that, initially, either the shift or the inclination is estimated using a measured sine curve and, with the use of this estimate, the respectively other value of the second measured sine curve is determined. These steps can be iteratively repeated until a sufficiently accurate determination has taken place and an appropriate adjustment can take place.

DE 196 51 232 C1 discloses a workpiece support with an adjustment assembly that can be activated in order to be able to adjust the position of a workpiece.

SUMMARY

Considering the prior art, the object of the present invention may be viewed as the provision of an improved method or an improved metrological apparatus for the adjustment of the attitude of a rotation-symmetrical workpiece.

The invention is intended for the adjustment of the attitude of the rotation-symmetrical workpieces having an arcuate upper surface. The workpieces need not have a cylindrical generated surface. In particular, these can be workpieces with an aspherical upper surface.

The metrological apparatus comprises a workpiece support that can be driven about a rotary axis. To do so, the metrological apparatus has a rotative machine axle that drives the workpiece support. An adjustment assembly is disposed to tilt a workpiece support axle relative to the rotary axis and at a right angle relative to the rotary axis in two different spatial directions in a translatory manner. The rotary axis extends parallel to or along a coordinate axis of the machine coordinate system. Furthermore, the metrological apparatus comprises a sensor unit for measuring points in the machine coordinate system on the outside surface of the workpiece. In so doing, the sensor unit detects the coordinate values of a measuring point in the machine coordinate system on the outside surface and, in particular, on the upper surface of the workpiece.

In order to adjust the workpiece, the workpiece support with the workpiece is initially brought into a first rotary position about the rotary axis. In this first rotary position, several measuring points are measured within a measuring plane of the machine coordinate system. Preferably, the measuring plane is oriented at a right angle relative to one of the coordinate axes of the machine coordinate system and may comprise the rotary axis or be oriented parallel thereto.

Following this, the workpiece support with a workpiece is rotated by an angle of rotation about the rotary axis into a second rotary position. In this second rotary position, several measuring points are measured in the same measuring plane of the machine coordinate system.

With the use of several measuring points in the two positions of rotation, the actual attitude of the tool is to be determined by fitting the measuring points in a known target geometry of the upper surface. The target attitude of the workpiece is pre-specified. The attitude of the workpiece is understood to be its position in the space, as well as the orientation of the axis of symmetry in the space. In the target attitude, the axis of symmetry of the workpiece coincides with the rotary axis of the workpiece support. The deviation between the actual attitude from the target attitude can be described by suitable parameters. According to the invention a tilt angle, as well as a shift, are defined, these describing the deviation between the target attitude and the actual attitude. The tilt angle describes the tilt or inclination of the axis of symmetry of the workpiece relative to the rotary axis, and the shift describes a radial positional deviation of the axis of symmetry from the rotary axis in a situation after the axis of symmetry has been tilted about a tilting point that is defined by the adjustment assembly in order to eliminate the originally existing tilt angle. Based on the determined tilt angle and the shift, it is possible to activate the adjustment assembly in order to bring the actual attitude to coincide with the target attitude.

According to the invention it is possible, with only two measured value sequences of respectively several measured points along a contour line of the upper surface in the measuring plane in different rotary positions of the workpiece, to determine the deviation and to perform an appropriate adjustment. Thus, it is possible with the method to achieve a good adjustment of the workpiece within a short time. Additional specific sensors are not necessary. The method can be performed with the already provided sensors on universal measuring devices such as shape testers and/or contour measuring devices. Consequently, the metrological apparatus according to the invention may be, for example, a shape tester or a shape measuring machine and/or a contour measuring device and/or a coordinate measuring device that comprise adjustment assemblies that can be activated, as well as comprise a workpiece support that can be driven about the rotary axis. These metrological apparatus are not specifically designed for one single measuring task but are universally suitable for different tasks. Nevertheless, it is possible with the invention to also perform, on such metrological apparatus, a single and good adjustment of rotation-symmetrical workpieces having an arcuate, for example, convex or concave, upper surface.

It is advantageous if the determined tilt angle comprises a tilt angle component around one of the two coordinate axes of the machine coordinate system that is oriented at a right angle relative to the rotary axis. Correspondingly, the adjustment assembly may comprise two tilt axles that can tilt or incline the workpiece support axle.

The determined shift may comprise two or more shift components. The shift preferably comprises two shift components along different coordinate axes at a right angle relative to the rotary axis and, optionally, another shift component in the direction parallel to the rotary axis. Corresponding to these shift components, the adjustment assembly of the metrological apparatus may comprise at least two translatory axles for the adjustment of the workpiece support.

In one advantageous embodiment, there is a verification following the activation of the adjustment assembly, as to whether or not the actual attitude sufficiently accurately coincides with the target attitude. If there is no sufficiently accurate coincidence, the measurements may be repeated in both rotary positions, and actual values for the shift and the tilt angle may be determined, whereby these then act as the basis for another activation of the adjustment assembly. Then, it is possible to verify again, whether—after this second iteration step—there is sufficiently accurate coincidence. This iterative process can be repeated until the specified accuracy is achieved or until no substantial improvement of the accuracy can be achieved by further iterations.

The measured points measured in different rotary positions of the workpiece support are detected—via the sensor unit—initially as measured points in the machine coordinate system. It is preferred if—in the course of determination of the tilt angle and the shift—the measured points are first transformed, as a function of the respectively associate rotary position, in the workpiece coordinate system of the workpiece.

The measured points, preferably the measured points transformed into the workpiece coordinate system, are fitted into a known target form or target geometry of the upper surface of the workpiece for the determination of the tilt angle. This fitting occurs in such a manner that an error or a deviation between the measured points describing the measured geometry of the workpiece and the known target geometry of the workpiece is minimal. The minimization of the error can be determined, for example, by known mathematical processes such as, for example, the method of the smallest error square.

In one exemplary embodiment each measuring point is allocated a target point of the target geometry. It is then possible to define—of each measured point—a vector for the allocated target point. With these vectors, it is possible to fit the measured points into the target geometry.

It is advantageous if the target geometry of the workpiece is specified in such a manner that it, at the same time, describes the target attitude of the workpiece. As a result of this, the target geometry not only describes the desired form of the upper surface but also its position and orientations relative to the rotary axis. In so doing, it is possible that, while the deviation between the actual attitude and the target attitude is determined—for example, vectors of measured points to target points—the tilt angle and the shift are determined based on the deviation or the vectors. By suitably selecting the shift and the tilt angle, it is possible, for example, to minimize the deviation between the geometry measured by means of the measuring points and the target attitude.

It is advantageous if the coordinate origin of the workpiece coordinate system is located on the axis of symmetry of the rotation-symmetrical workpiece on the upper surface. Preferably, this corresponds to the zenith of the convex rotation-symmetrical workpiece.

According to the inventive method it is possible to measure several measuring points, each in more than two rotary positions. The rotation of the workpiece support with the workpiece about the rotary axis and the subsequent measurement of the measuring points in the set rotary position can be repeated several times. Measurements are performed at least in two different rotary positions. The angle between the different rotary positions in which a measurement takes place, indicates a target angle of rotation between two consecutive rotary positions, said target angle of rotation being set by activation of the rotative machine axle of the metrological apparatus. The target angle of rotation between two successive rotary positions is preferably 180°, divided by the number of different rotary positions, in which measurements are performed. The actually set angle of rotation in a preferred embodiment may deviate from the determined target angle of rotation by a maximum of 10° or a maximum of 5°.

In performing the adjustment explained hereinabove, it is assumed that the precise axle arrangement of the adjustment assembly is known. Should the position of the adjustment axles and, in particular, the tilt axes of a metrological apparatus not be known with sufficient accuracy, it is possible—after the at least two measurements in different rotary positions and the subsequent determination of a first value at least for the tilt angle—to proceed as follows:

For tilting the workpiece, the adjustment assembly is activated as a function of the determined value of the tilt angle. Thereafter, the workpiece is measured again. Again, at least two different rotary positions are set and at least one measurement is performed.

Thereafter, it is known how the actual attitude of the workpiece has changed due to the tilting by means of the tilt axles of the adjustment assembly. As a result of this it is possible to determine an interrelationship between the actual tilting of the workpiece and the activation of the adjustment assembly to achieve tilting.

Subsequently, the measurements may be repeated in the different rotary positions, and one actual value for the tilt angle and the shift, respectively, can be determined. Then the adjustment assembly can be activated by means of the actual values for the tilt angle and the shift in order to bring the actual attitude of the workpiece to coincide with the desired target attitude.

This method can be performed by means of a control device of the metrological apparatus that activates the existing machine axles, the adjustment assembly and the sensor unit in order to perform the measurements, and that receives the corresponding measured sensor values from the sensor unit. The required calculations are performed in the control device.

Furthermore, it is advantageous if a height profile of the workpiece that is received during a measurement in a specific rotary position, displays a point of intersection with another height profile that was received during a measurement in another rotary position and, preferably in the adjacent rotary position. It is also possible that all recorded height profiles have a common point of intersection if the rotary axis of the metrological apparatus is in the measuring plane in which the individual height profiles are recorded. In this case, all height profiles may intersect at a point of intersection on which the rotary axis is located.

The control device can indicate the calculated results and/or the measured values, and/or other results or calculated values derived therefrom, via a suitable interface or transmit them to an external unit.

BRIEF DESCRIPTION OF THE DRAWINGS

Advantageous embodiments of the invention can be inferred from the dependent claims, the description and the drawings. Hereinafter, preferred exemplary embodiments are explained in detail with reference to the appended drawings. They show in FIG. 1 a schematic representation of the principle of an exemplary embodiment with a workpiece that is to be measured, FIG. 2 a schematic representation of the principle of the determined shift of the axis of symmetry of the workpiece relative to an rotary axis of the metrological apparatus, FIGS. 3a to 3c a representation of the principle of the adjustment of the workpiece, wherein the axis of symmetry of said workpiece is oriented along the rotary axis of the metrological apparatus, FIG. 4 a representation of the principle of a first measurement of an upper surface of the workpiece in a measuring plane in a first rotary position, FIG. 5 a representation of the principle of a first measurement of an upper surface of the workpiece in a measuring plane in a second rotary position, FIG. 6 a qualitative representation of an exemplary measurement in the first rotary position, FIG. 7 a qualitative representation of an exemplary measurement in the second rotary position, FIG. 8 a representation of the principle for adapting the measured points on the surface of the workpiece in a target geometry of the surface, and FIG. 9 a representation of the principle of a further procedure for fitting the measured values in a known target geometry of the upper surface of the workpiece.

DETAILED DESCRIPTION

Figure 1:
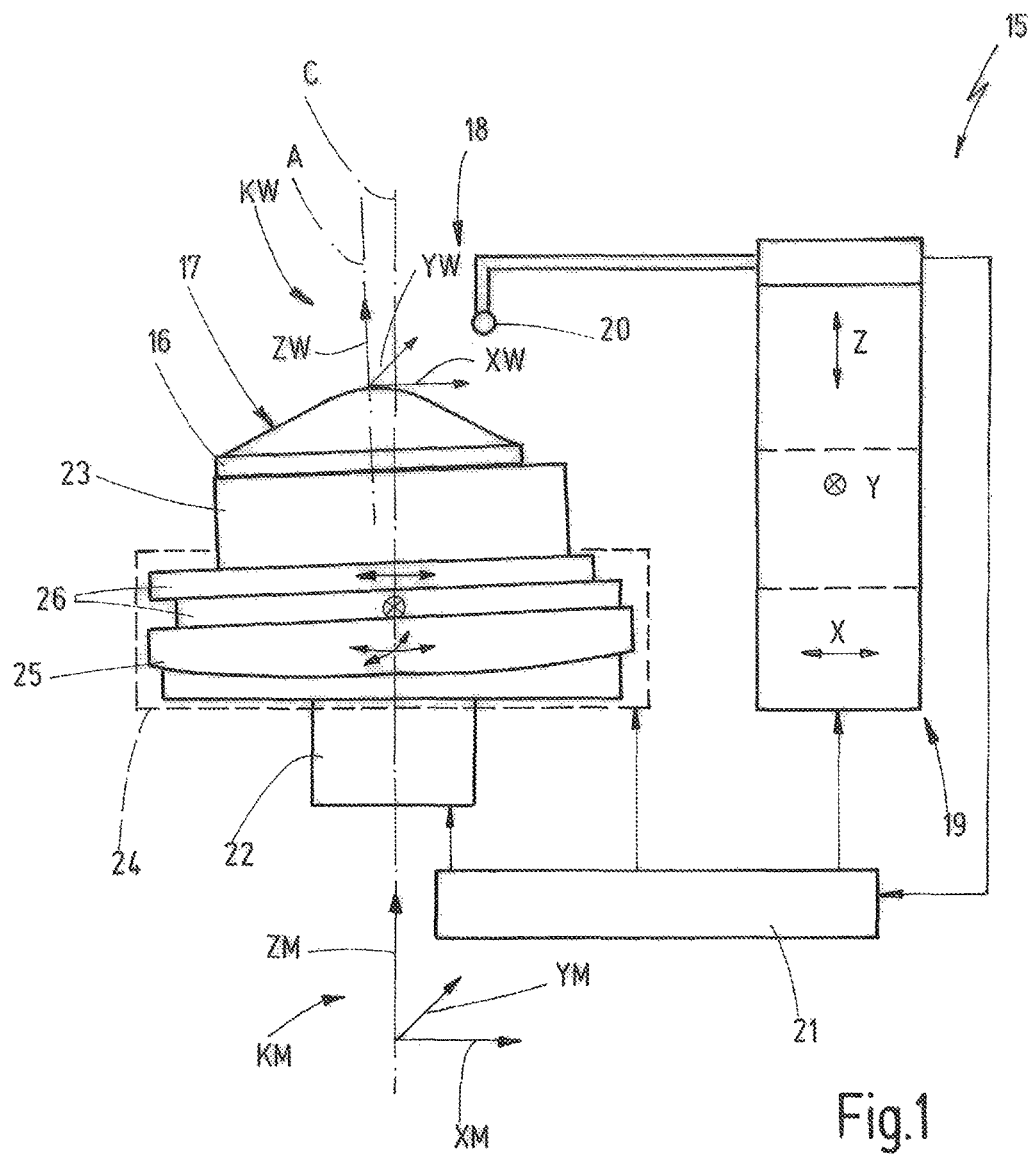
FIG. 1 schematically shows an exemplary embodiment of a metrological apparatus 15 in the manner of a block diagram. The metrological apparatus 15 may be a coordinate measuring device or a shape measuring device and can be universally used for several measuring tasks. It is disposed for measuring a rotation-symmetrical workpiece 16 with an arcuate upper surface 17. To do so, measured points on the upper surface 17 can be recorded. In so doing, each measuring point is defined by a point in a machine coordinate system KM. In accordance with the example, the machine coordinate system is embodied as a Cartesian coordinate system with three coordinate axes, namely an X-coordinate axis XM in an X-direction, a Y-coordinate axis YM in Y-direction and a Z-coordinate axis ZM in Z-direction.

A workpiece coordinate system KW has a Z-coordinate axis ZW that is oriented along an axis of symmetry A of the rotation-symmetrical workpiece 16. The coordinate origin is preferably located at the point at which the axis of symmetry A intersects the arcuate upper surface 17. In the exemplary embodiment, the upper surface 17 is curved in a convex manner and has its zenith in the coordinate origin on the axis of symmetry A. The workpiece 16, for example, is a workpiece having an aspherical upper surface 17. Furthermore, the workpiece coordinate system KW has an X-coordinate axis XW and a Y-coordinate axis YW, each being oriented at a right angle relative to each other and at a right angle relative to the Z-coordinate axis ZW, whereby they form a Cartesian coordinate system KW.

The metrological apparatus 15 comprises a sensor unit 18 for recording measured points on the outside surface of the workpiece 16. In so doing, the sensor unit 18 can be moved relative to the workpiece 16 via a machine axle assembly 19. In the exemplary embodiment described here, the machine axle assembly 19 comprises three translatory machine axles that can be used to move the sensor unit 18 respectively in the direction of one of the coordinate axes XM, YM, ZM of the machine coordinate system KM. In addition or as an alternative to the translatory machine axles of the machine axle assembly 19, there could also be provided one or more rotative machine axles.

The sensor unit 18 comprises a sensor 20, for example a sensor 20 that takes measurements by optical or tactile means. The sensor unit 18 transmits a sensor signal to a control device 21. Based on the sensor signal and the rotary position of the workpiece support 23 around the rotary axis C, it is possible to allocate a coordinate quadruple $x_{ij}$, $y_{ij}$, $z_{ij}$, $c_i$ in the machine coordinate system KM to each measured point on the outside surface—in accordance with the example, on the upper surface 17 of the workpiece 16. The control device 21 also controls the machine axle assembly 19 with the translatory and/or rotatory machine axles.

Furthermore, the metrological apparatus 15 comprises a workpiece support 23 that can be driven about a rotary axis C by means of a rotative machine axle 22. The workpiece support 23 is disposed to hold the workpiece 16. To do so, the workpiece support 23 may comprise a workpiece holder device suitable therefor, so that the workpiece cannot move relative to the workpiece support 23 during a measurement. The rotative machine axle 22 is activated by the control device 21.

Furthermore, the metrological apparatus 15 comprises an adjustment assembly 24. Via the adjustment assembly 24, it is possible to move the workpiece support 23 with the workpiece 16 arranged thereon into a desired attitude for measurement. To do so, the adjustment assembly 24 has at least one—according to the example several—adjustment axles that may be configured as translatory axles or pivot axles or tilt axles. In the illustrated example, the adjustment assembly 24 comprises a tilt table 25, by means of which the workpiece support 23 and the workpiece 16 arranged thereon, respectively, can be pivoted or tilted about two axes that are oriented at a right angle relative to each other.

The tilt table 25 can tilt the workpiece support 23 with the workpiece 16 about a first tilt axis that is oriented parallel to the X-coordinate axis XW of the workpiece coordinate system KW and about a second tilt axis that is oriented parallel to the Y-coordinate axis YW of the workpiece coordinate system KW.

Furthermore, the adjustment assembly 24 comprises two translatory adjustment axles 26, in which case the one translatory adjustment axle can shift the workpiece support 23 parallel to the X-coordinate axis of the workpiece coordinate system KW, and the respectively other translatory adjustment axle 26 can shift the workpiece support 23 parallel to the Y-coordinate axis of the workpiece coordinate system KW.

The adjustment assembly 24 is activated by the control device 21. The control device 21 specifies the rotary position $c_i$ about the rotary axis C, as well as the positions for the machine axle assembly 19. The respective attitude or position values relative to the machine coordinate system KM are thus known as target values in the control device 21. It is possible to detect the respective positions of the axles by sensory means and to transmit these to the control device 21, so that actual values are also present in the control device 21, for example in order to perform an adjustment.

Via the adjustment assembly 24, it is possible to tilt the axis of symmetry A of the workpiece 16 or a workpiece support axis relative to the rotary axis C and to move it relative to the rotary axis C in X-direction and Y-direction of the workpiece coordinate system KW via the adjustment assembly 24.

Figure 2:
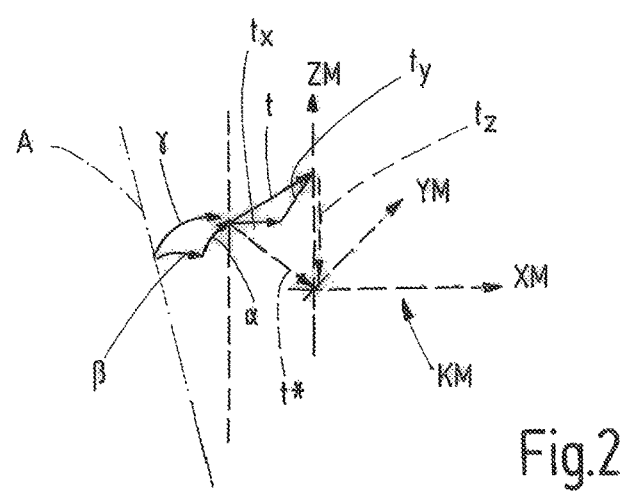

FIG. 1 schematically illustrates that the workpiece 16 arranged on the workpiece support 23 is oriented—relative to the rotary axis C—not in a desired target attitude Ls. The axis of symmetry A is inclined relative to the rotary axis C or the Z-coordinate axis ZM of the machine coordinate system KM and/or shifted in the X-Y-plane of the machine coordinate system KM. Therefore, the attitude of the axis of symmetry A can generally be stated by a tilt angle $\gamma$ and a shift t in the X-Y-plane of the workpiece coordinate system KW (FIGS. 2 and 3). It is also possible, to define the shift t not only in one plane but also in space (shift t* in FIG. 2), so that the shift t* displays not only an X-component $t_x$, a Y-component $t_y$, but—in addition—a Z-component $t_z$. Consequently, it is possible to bring the coordinate origin of the workpiece coordinate system KW and the coordinate origin of the machine coordinate system KM to coincide with each other. In this case, the adjustment assembly 24 comprises a translatory adjustment axle for moving the workpiece support 23 in Z-direction. At this point it should be pointed out that—to avoid confusion—the machine coordinate system KM in FIG. 1 is drawn under the workpiece support 23. The origin of the machine coordinate system KM in the last-mentioned case would have to be defined above the workpiece support 23. Said origin can be specified at any point along the rotary axis C by appropriate initialization, depending on the workpiece 16 to be measured.

Generally, the tilt angle $\gamma$ can be described by two tilt angle components $\alpha$, $\beta$. Therefore, the tilt angle component about the X-coordinate axis XW is referred to as the tilt angle component $\alpha$, and the tilt angle component about the Y-coordinate axis of the workpiece coordinate system KW is referred to as the tilt angle component $\beta$. Both tilt angle components $\alpha$, $\beta$ together result in the tilt angle $\gamma$ between the orientation of the axis of symmetry A and the line parallel to the rotary axis C or to the Z-coordinate axis ZM of the machine coordinate system KM.

The shift t results from a vector addition of the shift components in the different spatial directions, for example from a shift component $t_x$ along the X-coordinate axis XW and a shift component $t_y$ along the Y-coordinate axis YW of the workpiece coordinate system KW.

Figure 3A:
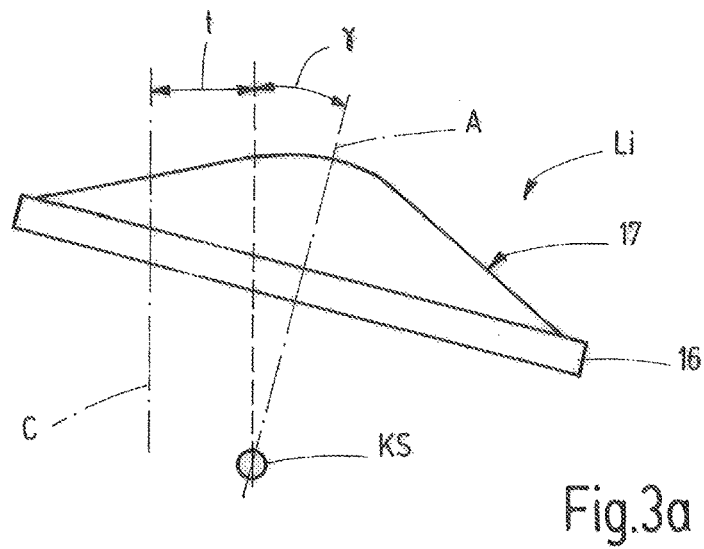
Figure 3B:
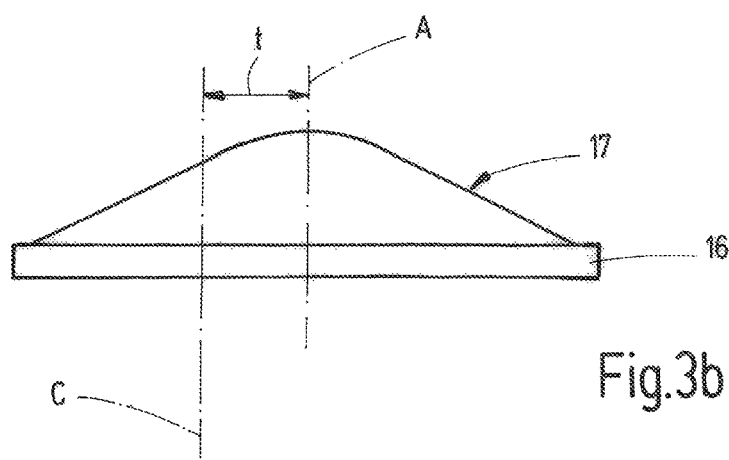
Figure 3C:
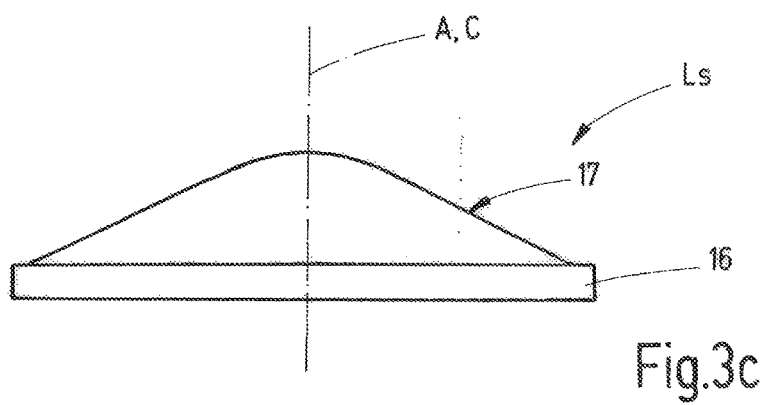

FIGS. 3a to 3c show the principle of adjustment in a schematic manner. The workpiece 16 that initially assumes a random actual attitude Li is tilted via the adjustment assembly 24—in accordance with the example, the tilt table 25—by the tilt angle $\gamma$, so that the axis of symmetry A is oriented parallel to the rotary axis C (FIG. 3b). Subsequently, the workpiece 16 is moved by the shift t, so that the axis of symmetry A is oriented along the rotary axis C, and the workpiece 16 assumes the target attitude Ls (FIG. 3c). In order to be able to perform the adjustment, the tilt angle $\gamma$ and the shift t must be determined. The method for determining these parameters will be explained hereinafter with reference to FIGS. 4 to 9.

Figure 4:
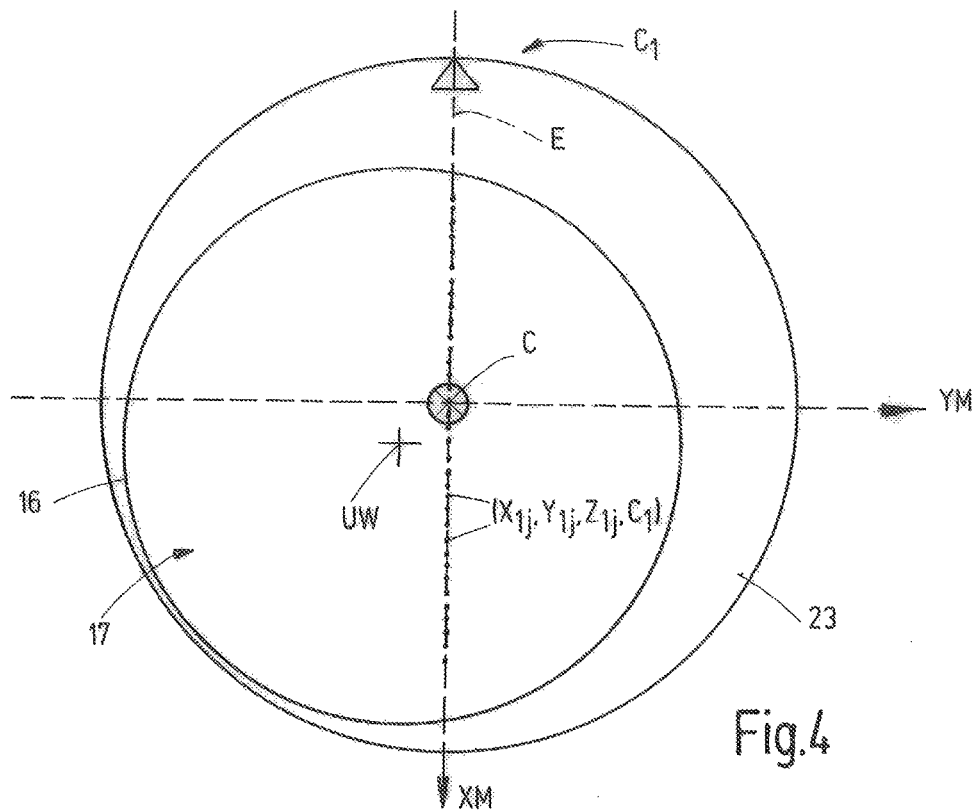
Figure 5:
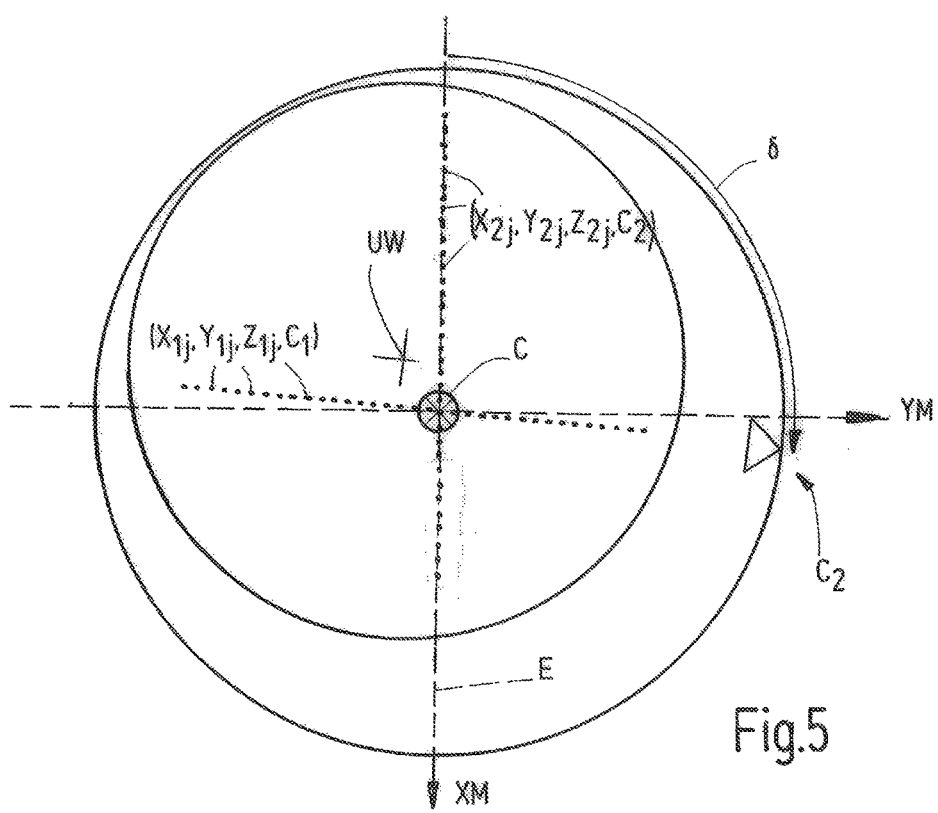

FIGS. 4 and 5 are greatly simplified plan views of the workpiece support 23 and the workpiece 16 arranged thereon. The coordinate origin UW of the workpiece coordinate system KW is marked. The coordinate origin UW corresponds to the zenith of the workpiece 16 or the puncture point of the axis of symmetry A through the upper surface 17. The rotary axis C extends perpendicularly to the plane of projection.

In a first step S1, the workpiece support 23 and the workpiece 16, respectively, are moved into a first rotary position or the actual rotary position is defined as the first rotary position $c_1$. In this first rotary position $c_1$ in the first step S1, several measured values in a measuring plane E are recorded. In accordance with the example, the measuring plane E is defined by the machine coordinate axes XM, ZM and thus oriented at a right angle relative to the Y-coordinate axis YM of the machine coordinate system KM. The rotary axis C thus extends inside the measuring plane E. As an alternative thereto, the measuring plane E may also be arranged parallel to and at a distance from the rotary axis C. In this first rotary position $c_1$, the sensor unit 15 records the coordinates of several measured points $x_{1j}, y_{1j}, z_{1j}, c_1$ on the upper surface 17.

In a second step S2, the workpiece support 23 with the workpiece 16 is rotated by an angle of rotation $\delta$ about the rotary axis C into a second rotary position $c_2$. In the exemplary embodiment, the angle of rotation $\delta$ is approximately 90° and may deviate from the target angle of rotation by preferably at most by 5°. In this second rotary position $c_2$, the measuring points $x_{2j}, y_{2j}, z_{2j}, c_2$ are measured in the same measuring plane E relative to the machine coordinate system KM (step S3).

At least two measurements are recorded in two different rotary positions $c_1$, $c_2$ with respectively several measuring points $x_{ij}$, $y_{ij}$, $z_{ij}$, $c_i$. The index i=1, 2, 3, . . . thus indicates the number of the measured value sequence during the measurement of several measuring points in one of the rotary positions. It is also possible to perform two measurements in more than two different rotary positions. The index j=1, 2, 3, . . . indicates the number of the measuring point in a measured value sequence. The number of measuring points in the measuring plane E along the upper surface 17 is selected as a function of the required accuracy.

Generally, the target angle of rotation $\delta_{soll}$ between two consecutive rotary positions $c_i$ and $c_{i+1}$ is calculated as follows:

$$\delta_{soll} = \frac{180°}{M} \quad (1)$$

where M is the number of measured value sequences i=1, 2, 3, . . . , M in various rotary positions. In the event of measurements in two different rotary positions $c_1$, $c_2$, the target angle of rotation $\delta_{soll}$ thus is equal to 90°. The more rotary positions are used for respectively one measured value sequence, the fewer iterations are required for achieving a specified accuracy of the adjustment of the axis of symmetry A of the workpiece 16 along the rotary axis C. Correspondingly, with a specified number of iterations due to a greater number of rotary positions, it is possible to achieve an improved accuracy of the adjustment of the axis of symmetry of a workpiece 16 along the rotary axis C.

The recorded measured points $x_{ij}$, $y_{ij}$, $z_{ij}$, $c_i$ describe the actual attitude Li of the workpiece 16. The target geometry of the workpiece surface 17 of the measured workpiece 16, for example an aspherical surface, is known. By fitting the measured points $x_{ij}$, $y_{ij}$, $z_{ij}$, $c_i$ in the known target geometry, it is thus possible to determine the actual attitude Li. The deviation of the actual attitude Li from the desired target attitude Ls of the workpiece 16 can be described by the shift t and the tilt angle $\gamma$. If the target geometry for the upper surface 17 or the workpiece 16, at the same time, also defines the target attitude, it is possible by fitting the measuring points in the target attitude Ls, also at the same time, to determine the shift t and the tilt angle $\gamma$.

Figure 6:
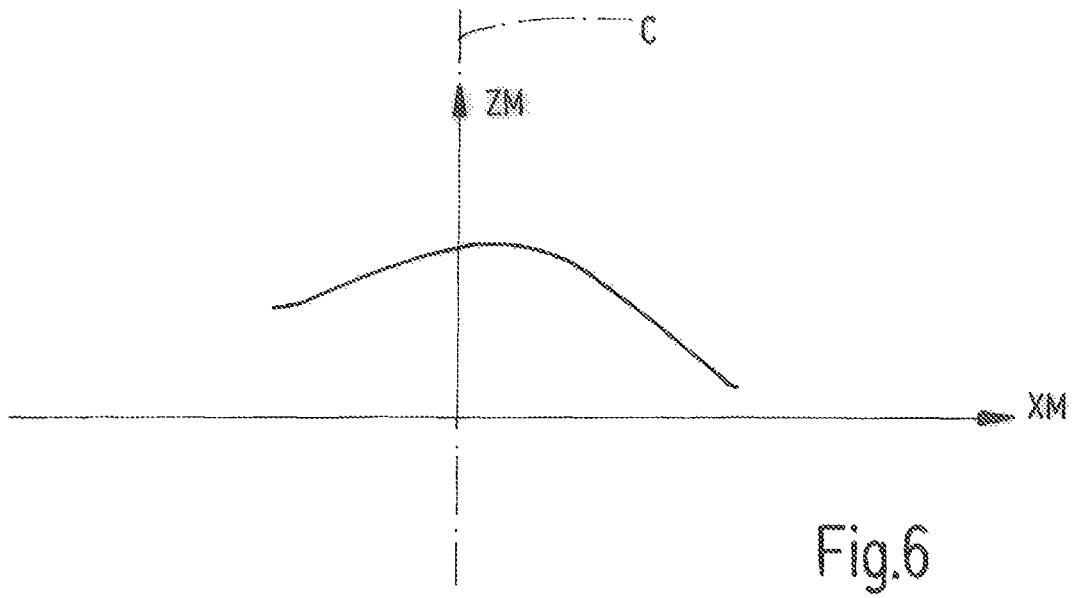
Figure 7:
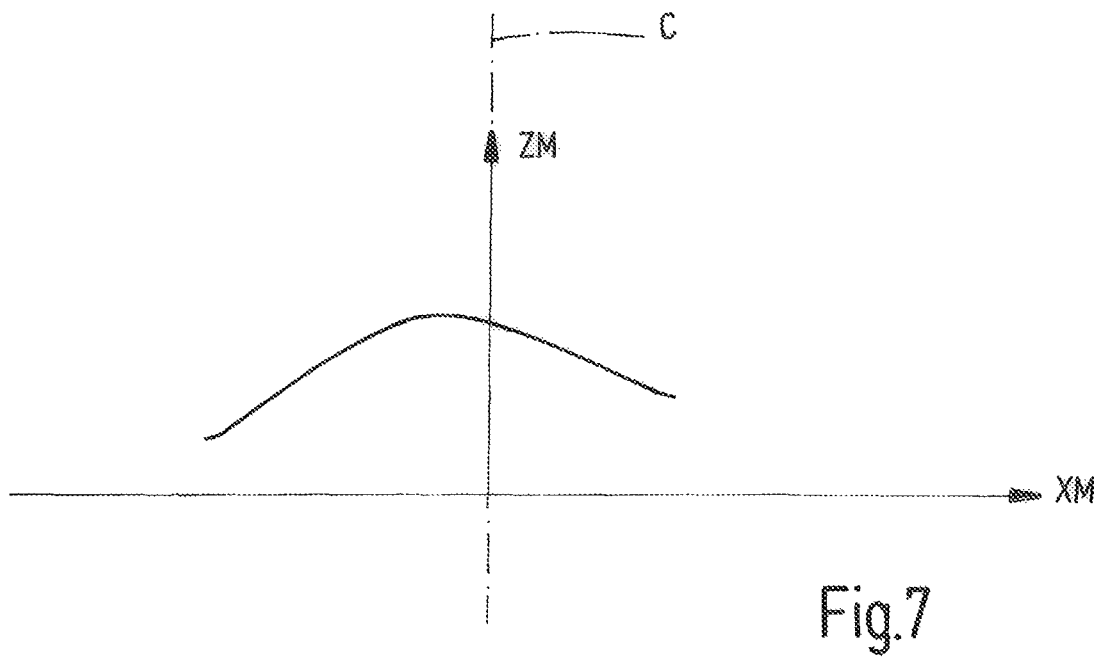
Figure 8:
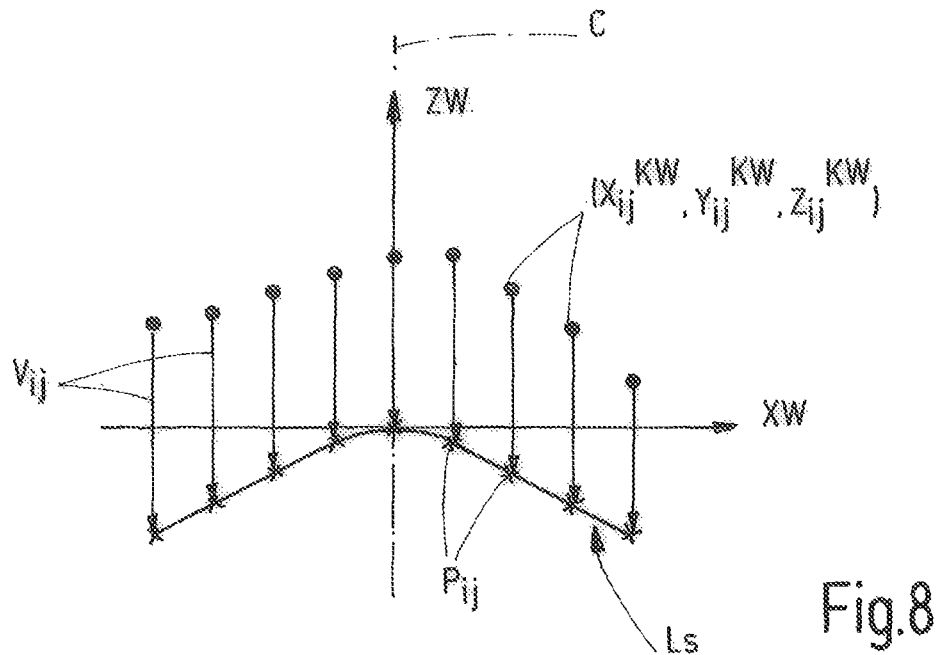
Figure 9:
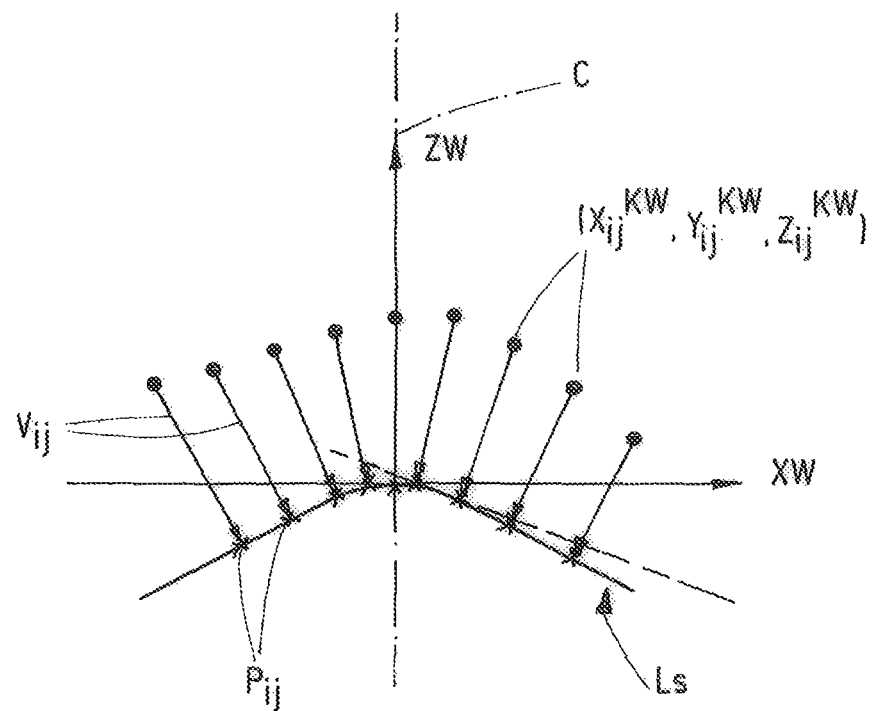

The Z-contour lines described by the measured points $x_{ij}$, $y_{ij}$, $z_{ij}$, $c_i$ along the X-coordinate axis XM of the machine coordinate system KM are illustrated as a qualitative example in FIGS. 6 and 7. Each measurement in a rotary position $c_i$ describes such a contour line.

Each measured point of a measurement can be described by its coordinates $x_{ij}$, $y_{ij}$, $z_{ij}$ in the space of the machine coordinate system KM, as well as the rotary position $c_i$, so that a coordinate quadruple $x_{ij}$, $y_{ij}$, $z_{ij}$, $c_i$ is the result. As explained, the index i refers to the number of the measured value sequence, and the index j refers to the number of the point of a measured value sequence. In accordance with the example, the measured points are first transformed by the machine coordinate system KM into the workpiece coordinate system KW:

$$\begin{pmatrix} x_{i,j}^{KW} \\ y_{i,j}^{KW} \\ z_{i,j}^{KW} \end{pmatrix} = \begin{pmatrix} \cos(c_i) & -\sin(c_i) & 0 \\ \sin(c_i) & \cos(c_i) & 0 \\ 0 & 0 & 1 \end{pmatrix} * \begin{pmatrix} x_{i,j} \\ y_{i,j} \\ z_{i,j} \end{pmatrix} \quad (2)$$

The obtained measured points $x_{i,j}^{KW}$, $y_{i,j}^{KW}$, $z_{i,j}^{KW}$ are fitted into the known target geometry while minimizing the deviation. Two basic options of such a fitting are shown in a highly schematic manner by FIGS. 8 and 9. Each of the individual measured points $x_{i,j}^{KW}$, $y_{i,j}^{KW}$, $z_{i,j}^{KW}$ can be allocated a target point $P_{ij}$ on the upper surface 17 of the workpiece 16 in the target attitude Ls—the target geometry of the upper surface 17 being known. For example, the allocation for all measured points $x_{i,j}^{KW}$, $y_{i,j}^{KW}$, $z_{i,j}^{KW}$ may take place along the same direction (FIG. 8), for example, parallel to the Z-coordinate axis ZM or, alternatively, in the direction of the normal (FIG. 9) relative to the upper surface 17 of the workpiece 16 that is in the target attitude Ls. From each measured point $x_{i,j}^{KW}$, $y_{i,j}^{KW}$, $z_{i,j}^{KW}$, a vector $V_{ij}$ points to an allocated target point $P_{ij}$ on the upper surface 17 of the workpiece 16. Each of the vectors $V_{ij}$ represents the deviation of the actual attitude Li from the target attitude Ls, and the sough adjustment parameters, i.e., the tilt angle $\gamma$ and the shift t, can be determined based on these. In so doing, the adjustment parameters (tilt angle $\gamma$, shift t) are determined in such a manner that the deviation during the fitting of the measured points $x_{i,j}^{KW}$, $y_{i,j}^{KW}$, $z_{i,j}^{KW}$ into the target geometry of the upper surface 17 is as small as possible. For this purpose, a suitable measure of quality may be determined. For example, the method of the smallest error squares or another known mathematical procedure may be employed in order to minimize the determined measure of quality or the deviation.

After the determination of the shift t and the tilt angle $\gamma$ in the fourth step S4, the adjustment assembly 24 is activated by the control device 21. In so doing, the tilt axles of the tilt table 25 are first activated in order to perform the appropriate tilting of the workpiece 16 in order to orient the axis of symmetry A parallel to the rotary axis C. Subsequently, the translatory adjustment axles 26 are activated in order to shift the axis of symmetry A of the workpiece 16 toward the rotary axis C. The activation of the adjustment assembly 24 aims to bring the actual attitude Li of the workpiece 16 to coincide with the target attitude Ls.

In a sixth step S6 a repeated measurement may be performed in one or more rotary positions, and the deviation of the actual attitude Li from the target attitude Ls can be evaluated. If a desired accuracy has not been reached yet, actual values for the tilt angle $\gamma$ and the shift t can be calculated and the adjustment assembly 24 can be activated consistent with the calculated parameters. This iterative process can be repeated several times until the specified accuracy is reached or no substantial improvement of accuracy can be achieved by additional iterations.

The method explained hereinabove in general will be illustrated with reference to an example hereinafter. The mean squared error is minimized here as the measure of quality in order to fit the transformed measured points $x_{i,j}^{KW}$, $y_{i,j}^{KW}$, $z_{i,j}^{KW}$ in the target geometry or the target attitude Ls.

The nominal design (target geometry) of the workpiece 16 or the upper surface 17 is known. In accordance with the example, this is an asphere. The height value or z-value $z_{asp}$ of the asphere may be expressed, for example, by the following asphere formula:

$$z_{asp}(x^{KW}, y^{KW}) = \quad (3)$$

$$z_{asp}(r^{KW}) = \frac{(r^{KW})^2 / R_0}{1 + \sqrt{1 - (1+k)\left(\frac{r^{KW}}{R_0}\right)^2}} + \sum_{n=2}^{N} A_{2n}(r^{KW})^{2n} \text{ with}$$

$$r^{KW} = \sqrt{(x^{KW})^2 + (y^{KW})^2} \quad (4)$$

where $R_0$ is the base radius of the asphere, k is the conical constant, and $A_{2n}$ are the aspheric coefficients. In equation (3), the origin of the workpiece coordinate system KW is in the zenith of the asphere.

The measured points transformed into the workpiece coordinate system KW are thus fitted in the target geometry (nominal aspheric design) given by equation (3) in such a manner that the mean squared error between the z-coordinate of the fitted in points and the z-value $z_{asp}$ of the target geometry at the allocated locations x, y of the fitted-in measured points is minimal. To do so, according to the example, two rotation or tilt parameters (tilt angle components $\alpha$, $\beta$) and two or three translation parameters (shift components $t_x$, $t_y$, and optionally $t_z$) are determined so that the following expression is minimal:

$$\sum_{i=1}^{I} \sum_{j=1}^{J_i} (\tilde{z}_{i,j}^{KW} - z_{asp}(\tilde{x}_{i,j}^{KW}, \tilde{y}_{i,j}^{KW}))^2 \quad (5)$$

In so doing, $\tilde{x}_{i,j}^{KW}$, $\tilde{y}_{i,j}^{KW}$ und $\tilde{z}_{i,j}^{KW}$, are calculated by means of $$\begin{pmatrix} \tilde{x}_{i,j}^{KW} \\ \tilde{y}_{i,j}^{KW} \\ \tilde{z}_{i,j}^{KW} \end{pmatrix} = \begin{pmatrix} 1 & 0 & 0 \\ 0 & \cos(\alpha) & -\sin(\alpha) \\ 0 & \sin(\alpha) & \cos(\alpha) \end{pmatrix} * \begin{pmatrix} \cos(\beta) & 0 & \sin(\beta) \\ 0 & 1 & 0 \\ -\sin(\beta) & 0 & \cos(\beta) \end{pmatrix} \begin{pmatrix} x_{i,j}^{KW} \\ y_{i,j}^{KW} \\ z_{i,j}^{KW} \end{pmatrix} + \begin{pmatrix} t_x \\ t_y \\ t_z \end{pmatrix} \quad (6)$$

Inasmuch as, in accordance with the example, the target geometry has the coordinate origin of the workpiece coordinate system KW at the zenith of the asphere and the rotary axis C in the machine coordinate system KM extends through the coordinate origin of the machine coordinate system KM, the shift components $t_x$ in X-direction of the workpiece coordinate system KW and $t_y$ in Y-direction of the workpiece coordinate system KW indicate the shift of the axis of symmetry A of the workpiece 16 at a right angle relative to the rotary axis C, and the tilt angle components $\alpha$ about the X-direction of the workpiece coordinate system KW and $\beta$ about the Y-direction of the workpiece coordinate system KW form the tilt angle $\gamma$ between the axis of symmetry A and the rotary axis C.

After determining the shift t and the tilt angle $\gamma$, the adjustment assembly 24 can be activated accordingly in order to bring the actual attitude Li into coincidence with the target attitude Ls. As explained, the method can be repeated iteratively in order to increase the accuracy.

In the aforementioned exemplary embodiments the arrangement of the adjustment axles of the adjustment assembly 24 was assumed as being known. As is schematically illustrated by FIG. 3a, the workpiece 16 is pivoted by means of the tilt table 25 about a tilt point KS that is located at a distance from the workpiece 16. If this distance is not exactly known, the method described hereinabove can be modified as described hereinafter.

Following the determination of a first value for the tilt angle $\gamma$ (in the fourth step S4), the tilt table 25 can first be activated in order to move the workpiece support 23 consistent with the determined tilt angle $\gamma$.

Subsequently, the workpiece support 23, for example, is again moved into the first rotary position $c_1$, and another measurement of a measuring value sequence in the measuring plane E is performed. Then the workpiece support 23 is rotated, for example into the second rotary position $c_2$, and again a measurement of a measuring value sequence in the measuring plane E is performed. Following these two measurements of the measuring value sequences, again an actual value for the tilt angle and the shift is calculated based on the actual measurements. Inasmuch as after a tilting of the workpiece support 23 and the repeated measurement it is known how the tilt attitude of the workpiece support 23 or the workpiece 16 has changed, it is now possible—based on the actual measurements and the determined actual tilt angle, as well as the determined actual shift—to activate the adjustment assembly 24 in order to bring the actual attitude Li into coincidence with the target attitude Ls. It is also understood in this method, that a measurement is performed in at least three rotary positions; however, it also possible to perform measurements in more than three rotary positions as has already been explained in conjunction with other exemplary embodiments.

The invention relates to a method and a metrological apparatus 15 that is disposed for the adjustment of an attitude of a workpiece 16 having an arcuate upper surface 17 relative to a rotary axis C of the metrological apparatus 15. The workpiece 16 is brought by a workpiece support 23 into a first rotary position $c_1$. A plurality of measured points within a measuring plane on the upper surface 17 is recorded. The workpiece 16 is moved into a further rotary position $c_2$ about the rotary axis C, and again measured points in the measuring plane E on the upper surface 17 of the workpiece 16 are recorded. Based on these recorded measured points, it is possible to determine the actual attitude Li of the workpiece 16, as well as the deviation from the specified target attitude Ls. In the target attitude Ls, the axis of symmetry A of the workpiece 16 is moved to coincide with the rotary axis C. To do so, adjustment parameters, for example a tilt angle $\gamma$ and a shift t, are determined, and an adjustment assembly 24 of the metrological apparatus 15 is activated as a function of the calculated adjustment parameters in order to adjust the workpiece 16.

LIST OF REFERENCE SIGNS

15 Metrological apparatus
16 Workpiece
17 Upper surface of the workpiece
18 Sensor unit
19 Machine axle assembly
20 Sensor
21 Control device
22 Rotative machine axle
23 Workpiece support
24 Adjustment assembly
25 Tilt table
26 Translatory adjustment axle
$\alpha$ Tilt angle component around the x-direction of the workpiece coordinate system
$\beta$ Tilt angle component around the y-direction of the workpiece coordinate system
$\gamma$ Tilt angle
$\delta$ Angle of rotation
$\delta_{soll}$ Target angle of rotation
A Axis of symmetry of the workpiece
C Rotary axis $c_i$ Rotary position of the workpiece about the rotary axis in the machine coordinate system KM
KM Machine coordinate system
KW Workpiece coordinate system
KS Tilt point
Li Actual attitude
Ls Target attitude
$P_{ij}$ Target point
t Shift
$t_x$ Shift component in x-direction of the workpiece coordinate system
$t_y$ Shift component in y-direction of the workpiece coordinate system
$t_z$ Shift component in z-direction of the workpiece coordinate system
UW Coordinate origin of the workpiece coordinate system
$V_{ij}$ Vector
$x_{ij}$ Coordinate of a measuring point in the machine coordinate system
$x_{i,j}^{KW}$ x-coordinate of a measuring point in the machine coordinate system
XM X-coordinate axis of the machine coordinate system
XW X-coordinate axis of the of the workpiece coordinate system
$y_{ij}$ y-coordinate of a measuring point in the machine coordinate system
$y_{i,j}^{KW}$ y-coordinate of a measuring point in the workpiece coordinate system
YM Y-coordinate axis of the machine coordinate system
YW Y-coordinate axis of the workpiece coordinate system
$z_{ij}$ z-coordinate of a measuring point in the machine coordinate system
$z_{i,j}^{KW}$ z-coordinate of a measuring point in the workpiece coordinate system
ZM Z-coordinate axis of the machine coordinate system
ZW Z-coordinate axis of the workpiece coordinate system

The invention claimed is:

1. Method for adjusting an attitude of a rotation-symmetrical workpiece (16) having an arcuate upper surface (17) in a metrological apparatus (15) that comprises a workpiece support (23) that can be driven about a rotary axis (C), and that—via an adjustment assembly (24)—can be tilted relative to the rotary axis (C) and moved at a right angle relative to the rotary axis (C) in two spatial directions, wherein the metrological apparatus (15) comprises a sensor unit (18) configured to measure measuring points ($x_{ij}$, $y_{ij}$, $z_{ij}$, $c_i$) in a machine coordinate system (KM) of the metrological apparatus (15) on an outside surface of the workpiece (16), the method comprising:
   S1: Measuring a first set of measuring points ($x_{1j}$, $y_{1j}$, $z_{1j}$, $c_1$) in a measuring plane (E) of the machine coordinate system (KM) on the upper surface (17) of the workpiece (16) in a first rotary position ($c_1$) of the workpiece (16) about the rotary axis (C),
   S2: Rotating the workpiece support (23) with the workpiece (16) by an angle of rotation ($\delta$) about the rotary axis (C) into a second rotary position ($c_2$),
   S3: Measuring of a second set of measuring points ($x_{2j}$, $y_{2j}$, $z_{2j}$, $c_2$) in the same measuring plane (E) in the machine coordinate system (KM) on the upper surface (17) of the workpiece (16) in the second rotary position ($c_2$) of the workpiece (16),
   S4: Determining a tilt angle ($\gamma$) and a shift (t) out of an actual attitude (Li) of the workpiece (16) described by the first and second sets of measuring points ($x_{ij}$, $y_{ij}$, $z_{ij}$, $c_i$) into a target attitude (Ls) of the workpiece (16),
   S5: Activating the adjustment assembly (24) as a function of the tilt angle ($\gamma$) and the shift (t) in order to bring the actual attitude (Li) into coincidence with the target attitude (Ls).

2. Method according to claim 1, wherein the machine coordinate system (KM) has a coordinate axis (ZM) parallel to the rotary axis (C) and two coordinate axes (XM, YM) at a right angle relative to the rotary axis (C).

3. Method according to claim 2, wherein the tilt angle ($\gamma$) has a tilt angle component ($\alpha$, $\beta$) about one of the two coordinate axes (XW, YW) of the workpiece coordinate system (KW).

4. Method according to claim 2, wherein the shift (t) has a shift component ($t_x$, $t_y$) in a direction of one of the two coordinate axes (XW, YW) of the workpiece coordinate system (KW).

5. Method according to claim 4, wherein the shift (t) has a ZW shift component ($t_z$) in a direction of a third coordinate axis (ZW) of the workpiece coordinate system (KW), said axis being oriented parallel to the rotary axis (C).

6. Method according to claim 1, further comprising, following step S5, verifying coincidence of the actual attitude (Li) with the target attitude (Ls) in a step S6.

7. Method according to claim 6, further comprising repeating steps S1 to S6 in response to determining in step 6 that the actual attitude (Li) and the target attitude (Ls) do not coincide with a specified accuracy.

8. Method according to claim 1, further comprising converting in step S4 the first and second sets of measuring points ($x_{ij}$, $y_{ij}$, $z_{ij}$, $c_i$) for determining the tilt angle ($\gamma$) and the shift (t) into workpiece coordinate system measurement points ($x_{i,j}^{KW}$, $y_{i,j}^{KW}$, $z_{i,j}^{KW}$) in the workpiece coordinate system (KW) of the workpiece (16).

9. Method according to claim 1, further comprising fitting in step S4 the workpiece coordinate system measurement points ($x_{i,j}^{KW}$, $y_{i,j}^{KW}$, $z_{i,j}^{KW}$) for determining the tilt angle ($\gamma$) and the shift (t) into a known target geometry of the upper surface (17) of the workpiece (16) in such a manner that deviation between the geometry described by the workpiece coordinate system measurement points ($x_{i,j}^{KW}$, $y_{i,j}^{KW}$, $z_{i,j}^{KW}$) and the target geometry is minimal.

10. Method according to claim 9, further comprising specifying the target geometry of the workpiece (16) in a way to also describe the target attitude (Ls) concurrently.

11. Method according to claim 10, further comprising allocating each of the workpiece coordinate system measurement points ($x_{i,j}^{KW}$, $y_{i,j}^{KW}$, $z_{i,j}^{KW}$) to a target point ($P_{ijx}$, $P_{ijy}$, $P_{ijz}$) of the target geometry and, depending on the vectors ($V_{ij}$) of each of the workpiece coordinate system measurement points ($x_{i,j}^{KW}$, $y_{i,j}^{KW}$, $z_{i,j}^{KW}$) to the allocated target point ($P_{ijx}$, $P_{ijy}$, $P_{ijz}$), determining the tilt angle ($\gamma$) and the shift (t) in such a manner that deviation between the measured geometry and the target geometry is minimal.

12. Method according to claim 9, wherein the coordinate origin of the workpiece coordinate system (KW) is located on an axis of symmetry (A) of the workpiece (16) and on the upper surface (17).

13. Method according to claim 1, further comprising performing the steps S2 and S3 N times, wherein N is a natural number unequal to zero, so that the measuring points ($x_{ij}$, $y_{ij}$, $z_{ij}$, $c_i$) are measured in at least two rotary positions ($c_1$, $c_2$), wherein a target angle of rotation ($C_{i+1} - C_i$) is equal to 180° divided by N+1.

14. Method according to claim 13, wherein the performing the steps S2 and S3 N times brings an adjusted angle of rotation ($\delta$) to within 10° of the target angle of rotation ($C_{i+1} - C_i$).

15. Method according to claim 13, further comprising performing the steps S1 through S5 for a specified number of iterations M, wherein performing the steps S2 and S3 for the N times of rotary positions ($c_i$) achieves an accuracy of the axis of symmetry (A) of the workpiece (16) along the rotary axis (C) greater than performing the steps S2 and S3 for less than N times.

16. Method according to claim 14, further comprising performing the steps S2 and S3 for the number N of rotary positions ($c_i$) for which a measuring value sequence of measuring points ($x_{ij}$, $y_{ij}$, $z_{ij}$, $c_i$) is measured, wherein the steps S1 through S5 are performed for fewer iterations M to a specified accuracy of adjustment of the axis of symmetry (A) of the workpiece (16) along the rotary axis (C).

17. Method according to claim 1 wherein, whenever a position of adjustment axes (25, 26) of the adjustment assembly (24) is not known with sufficient accuracy, step S5 further comprises:
S5a: Activating of the adjustment assembly (24) for tilting the workpiece (16) as a function of the tilt angle ($\gamma$),
S5b: Rotating of the workpiece support (23) with the workpiece (16) into a first adjusted rotary position ($c_i$) and measuring a first adjusted set of measuring points ($x_{ij}$, $y_{ij}$, $z_{ij}$, $c_i$) in the measuring plane (E) of the machine coordinate system (KM) on the upper surface (17) of the workpiece (16) in the first rotary position ($c_i$),
S5c: Rotating of the workpiece support (23) with the workpiece (16) into a second adjusted rotary position ($c_{i+1}$) and measuring a second adjusted set of measuring points $x_{i+1,j}$, $y_{i+1,j}$, $z_{i+1,j}$, $c_{i+1}$) in the measuring plane (E) of the machine coordinate system (KM) on the upper surface (17) of the workpiece (16) in the second rotary position ($c_{i+1}$),
S5d: Determining an actual value of the tilt angle ($\gamma$) and the shift (t) out of the actual attitude (Li) of the workpiece (16) described by the first adjusted set of measuring points (($x_{ij}$, $y_{ij}$, $z_{ij}$, $c_i$)) and the second adjusted set of measuring points ($x_{i+1,j}$, $y_{i+1,j}$, $z_{i+1,j}$, $c_{i+1}$) into the target attitude (Ls) of the workpiece (16),
S5e: Activating the adjustment assembly (24) as a function of the shift (t) from step S5d in order to bring the actual attitude (Li) in coincidence with the target attitude (Ls).

18. Metrological apparatus (15) disposed for aligning a rotation-symmetrical workpiece (16) having an arcuate upper surface (17), the apparatus comprising:
a workpiece support (23) that can be driven about a rotary axis (C), said workpiece support configured to be tilted, via an adjustment assembly (24), relative to the rotary axis (C) and configured to be movable at a right angle relative to the rotary axis (C) in two spatial directions,
a sensor unit (18) configured to measure measuring points ($x_{ij}$, $y_{ij}$, $z_{ij}$, $c_i$) in a machine coordinate system (KM) of the metrological apparatus (15) on an outside surface of the workpiece (16), and
a control device (21) that is configured to:
S1: measure a first set of measuring points ($x_{1j}$, $y_{1j}$, $z_{1j}$, $c_1$) in a measuring plane (E) of the machine coordinate system (KM) on the upper surface (17) of the workpiece (16) in a first rotary position ($c_1$) of the workpiece (16) about the rotary axis (C),
S2: rotate the workpiece support (23) with the workpiece (16) by an angle of rotation ($\delta$) about the rotary axis (C) into a second rotary position ($c_2$),
S3: measure a second set of measuring points ($x_{2j}$, $y_{2j}$, $z_{2j}$, $c_2$) in the same measuring plane (E) in the machine coordinate system (KM) on the upper surface (17) of the workpiece (16) in the second rotary position ($c_2$) of the workpiece (16),
S4: determine a tilt angle ($\gamma$) and a shift (t) out of an actual attitude (Li) of the workpiece (16) described by the first and second sets of measuring points ($x_{ij}$, $y_{ij}$, $z_{ij}$, $c_i$) into a target attitude (Ls) of the workpiece (16),
S5: activate the adjustment assembly (24) as a function of the tilt angle ($\gamma$) and the shift (t) in order to bring the actual attitude (Li) into coincidence with the target attitude (Ls).

* * * * *